Feb. 2, 1926.

L. C. COLE ET AL 1,571,323

AXLE TURNING LATHE

Filed March 19, 1924    5 Sheets-Sheet 1

INVENTORS
L. C. Cole and
Otto Pabst.
BY
ATTORNEY

Feb. 2, 1926.    1,571,323
L. C. COLE ET AL
AXLE TURNING LATHE
Filed March 19, 1924    5 Sheets-Sheet 2

INVENTORS
L. C. Cole and
Otto Pabst
BY
ATTORNEY

Feb. 2, 1926. 1,571,323
L. C. COLE ET AL
AXLE TURNING LATHE
Filed March 19, 1924 5 Sheets-Sheet 3

INVENTORS
L. C. Cole and
Otto Pabst.
BY
ATTORNEY

Feb. 2, 1926. 1,571,323
L. C. COLE ET AL
AXLE TURNING LATHE
Filed March 19, 1924 5 Sheets-Sheet 4

Fig. 8.

INVENTORS
L. C. Cole and
Otto Pabst.
BY
ATTORNEY

Patented Feb. 2, 1926.

1,571,323

UNITED STATES PATENT OFFICE.

LYNDON C. COLE AND OTTO PABST, OF HAMILTON, OHIO, ASSIGNORS TO NILES-BEMENT-POND COMPANY, OF NEW YORK, N. Y., A CORPORATION OF NEW JERSEY.

AXLE-TURNING LATHE.

Application filed March 19, 1924. Serial No. 700,286.

*To all whom it may concern:*

Be it known that we, LYNDON C. COLE and OTTO PABST, citizens of the United States, and residents of Hamilton, in the county of Butler and State of Ohio, have invented certain new and useful Improvements in Axle-Turning Lathes, of which the following is a specification.

This invention relates to lathes and particularly to an improved axle turning lathe. Car wheel axles require a plurality of heavy turning operations on each end thereof to rough cut and finish the several working surfaces. These surfaces include the wheel seat, dust guard, journal, and flange of the axle as hereinafter more fully described. In accordance with the invention, the lathe bed is provided with the usual means for supporting an axle at its ends and for rotating the same from the center thereof. A pair of tool carriages are provided on the bed respectively at opposite sides of the center driving means, and a tool slide having a tool turret thereon is mounted on each carriage. Each turret is adapted to carry a plurality of formed turning tools which may be successively brought into cutting position by indexing the turret. Also mounted on each carriage is a cam having an undulatory cam path including a plurality of rises and falls. A cam follower engages each cam path and is operative on its tool slide to intermittently engage the tools with the work as the cam rotates, the turret being adapted to be indexed between the intermittent tool engagements whereby different tools operate on the work. As illustrated and described, six turning operations are required to completely finish each end of the axle or work piece. Each cam is therefore provided with six undulations whereby each tool slide is moved toward and from the work six times at each complete rotation of its cam, the machine thereby being adapted to completely finish turning an axle during one complete rotation of the cams. The primary object of the invention is to provide an improved cam-actuated turning lathe of this general type.

Each turret as herein illustrated and described is adapted to carry two roughing tools and two finishing tools and these tools are adapted to perform four cutting operations on the work merely by indexing the turret. The remaining two cutting operations, above referred to, are performed by two of these tools after the carriage has been traversed to position the turret opposite another portion of the work. Novel means including a rack on each carriage engaged by a pinion on the bed and operated by an independent electric motor is provided for performing this carriage traversing operation. A lathe apron is secured to the front face of the bed beneath each carriage and houses gearing through which the said pinion may be either manually or motor operated to traverse the carriage. Another object of the invention is the provision of this improved carriage traversing mechanism.

As illustrated and described, a main motor is provided for rotating the work and the tool slide operating cams for performing the cutting operations. Other means including an electric motor for each cam is provided for independently rotating the cams and traversing the tool slides. Each of these motors is operatively connected to its cam and clutches provide disengageable connections between the cams and the main motor. As illustrated in the drawings, smaller and independent motors are provided for shifting such clutches. Another object of the invention is to provide an improved independent cam adjusting and tool slide traversing mechanism of this type.

As illustrated in the drawings, the tool slide operating cams are preferably located at the rear side of the machine and the tool slides at the front side thereof. Another object of the invention resides in providing index means at the front side of the machine and operatively connected to the cams for indicating the rotary position of such cams.

With the above and other objects in view, our invention consists in the features of construction and operation set forth in the following specification and illustrated in the accompanying drawings. In such drawings annexed hereto and forming a part of this specification, we have shown certain embodiments of our invention in a cam-actuated axle turning lathe but it will be understood that the invention can be otherwise embodied and that the drawings are not to be construed as defining or limiting the scope of the invention, the claims appended to this specification being relied upon for that purpose.

Referring to the figures of the drawings.

Referring to the drawings, 1 indicates the bed of our improved lathe on one end of which is mounted a headstock 2 and a main driving motor 3. A pair of work engaging centers 4 are supported in stocks 5 and 6 adjustably mounted on the ways 7 of the bed. Work rotating means of the type shown in Patent No. 1,226,051 is housed within a head 8 mounted on the ways 7 between the said stocks. A pair of tool carriages 9 are slidably mounted on the ways respectively at opposite sides of the member 8. These carriages and the mechanism cooperating with each are substantially identical as are also the turning operations performed on the two ends of the axle W.

A tool slide 10 is mounted on a transverse guide-way 11 on each carriage and a tool turret 12 adjustable about a vertical axis 13 is mounted on each slide. Four finishing tools or blades are mounted 90° apart on each turret. These tools comprise a wide roughing blade 14 and a corresponding finishing blade 15 and a smaller roughing blade 16 and a corresponding finishing blade 17. Each turret can be indexed about the axis 13 to bring any tool thereon into cutting position and the turret can then be secured in such position by a handle 18 and a wedge 18'.

As illustrated, the slides 10 are mounted on the forward ends of the carriages 9. Means for operating each slide is housed within a box 19 on the rear of the carriage. A cam drum 20 is rotatably mounted in each box 19 and each drum is provided with an undulatory cam path 21 therein having six rises and falls. A block 22 on each carriage has a roller 23 engaging in the cam path 21. A rod 24 adjustably connects each block to its respective tool slide 10. It will be observed that as the cams rotate, their respective tool slides are reciprocated in a manner corresponding to the cam paths.

Each end of the axle W, shown in the drawings, requires the cutting and finishing of four working surfaces, namely, the wheel seat W', the dust guard W², the journal W³, and the flange W⁴. The turning of these surfaces is performed by three rough turning operations and three finish turning operations. The blades 14 and 15 are used in performing four of these operations and the blades 16 and 17 are used in performing the other two operations, all of which is hereinafter more fully described.

In the turning operation, the main motor 3 is adapted to rotate both the work W and the cam drums 20. A pinion 25 on the motor shaft meshes with a gear 26 on a shaft 27 also carrying a pinion 28. The gear 26 meshes with a gear 29 loose on a shaft 30 and the pinion 28 meshes with a gear 31 also loose on the shaft 30. A clutch 32 is splined to the shaft 30 between gears 29 and 31 and a handle 33 is adapted to engage the clutch with either of such gears. The shaft 30 can therefore be driven at either of two speeds from the motor 3. A pinion 34 on the shaft 30 meshes with a gear 35 on a shaft 36 extending along the bed 1 between the ways 7. A pinion 37 splined to this shaft is in mesh with the usual work driving gear 38, the pinion 37 and gear 38 being housed within the head 8. The details of this work driving mechanism are fully shown in the above cited patent.

A pinion 39 on the shaft 36 is in mesh with a gear 40 on a shaft 41. Two gears 42 and 43 on the shaft 41 are respectively in mesh with two gears 44 and 45 loose on a shaft 46. A gear 47 splined to the shaft 46 can be shifted into mesh with a gear 48 on the shaft 41. The opposite faces of the gear 47 have clutch teeth adapted to cooperate with clutch teeth on the adjacent faces of gears 44 and 45 and the gear 47 can be shifted by means of a handle 49 into any one of its three positions. The shaft 46 can therefore be driven at any one of three speeds from the shaft 36.

A pinion 50 on the shaft 46 is in mesh with a gear 51 on a shaft 52. A gear 53 on the shaft 52 is operatively connected to a gear 54 on a shaft 55 through an idler gear 56. The shaft 55, which may be termed the "feed shaft," extends longitudinally of the bed beneath the boxes 19. Journaled within each box 19 and loose on the feed shaft 55 is a sleeve 57 carrying on one end thereof a worm 58 in mesh with a worm wheel 59 on a shaft 60. A pinion 61 on the shaft 60 is in mesh with a gear 62 on the cam drum. One portion 63 of a friction clutch is secured to the other end of the sleeve 57, a cooperating portion of the clutch being splined to the shaft 55. A clutch engaging member 64 is slidable on the shaft 55 and can be shifted by means of a yoke 65 into and out of clutch engaging position. We prefer to operate each of these clutch shifting yokes by a small electric motor 66, a worm 67 on each motor shaft meshing with worm wheel teeth on the adjacent clutch yoke. A pair of stops 68 and 69 are provided for limiting the movement of each yoke in both directions. Closing of the clutches 63—64 operatively connects the cam drums with the work driving mechanism whereby the drums are driven from the shaft 36 in a manner to automatically engage the tools with the work as the latter is rotated.

It is frequently necessary to rotatably adjust the cam drums 20 and to independently and rapidly rotate such drums for the purpose of providing a rapid traverse of the tool slides 10. As illustrated in the drawings, we prefer to perform this operation by independent electric motors 70, one for each drum. A shaft 71 is operatively connected by bevel gears 72 to each motor, one end of this shaft being squared for hand operation. A pinion 73 on the shaft 71 is in mesh with gear teeth on the clutch element 63. When either clutch 63—64 is disengaged, the adjacent cam drum can be operated from the motor 70 or manually operated from the shaft 71. It will be understood that this entire traversing mechanism as just described is carried by the carriage 9 within the box 19 thereon.

The position of each tool slide 10 depends upon the angular or rotary position of its operating cam drum 20. The following index means is provided for indicating such position of the drums to the operator at all times. An indexed dial 74 is rotatably mounted on the front of each carriage. A pinion 75 on a rearwardly extending shaft 76 is in mesh with gear teeth on this dial. A gear 77 on the rear end of each shaft 76 is in mesh with its cam drum gear 62. Therefore as each cam drum rotates, its dial 74 will be rotated a corresponding amount and thereby at all times indicate the exact position of the drum.

As before stated, four turning operations are performed merely by indexing the turret 12. To perform the remaining two of the six operations, heretofore referred to, the carriage 9 must be traversed on the ways 7 to position the turret opposite another portion of the work. The following novel carriage traversing mechanism is provided for this purpose.

Figure 9:
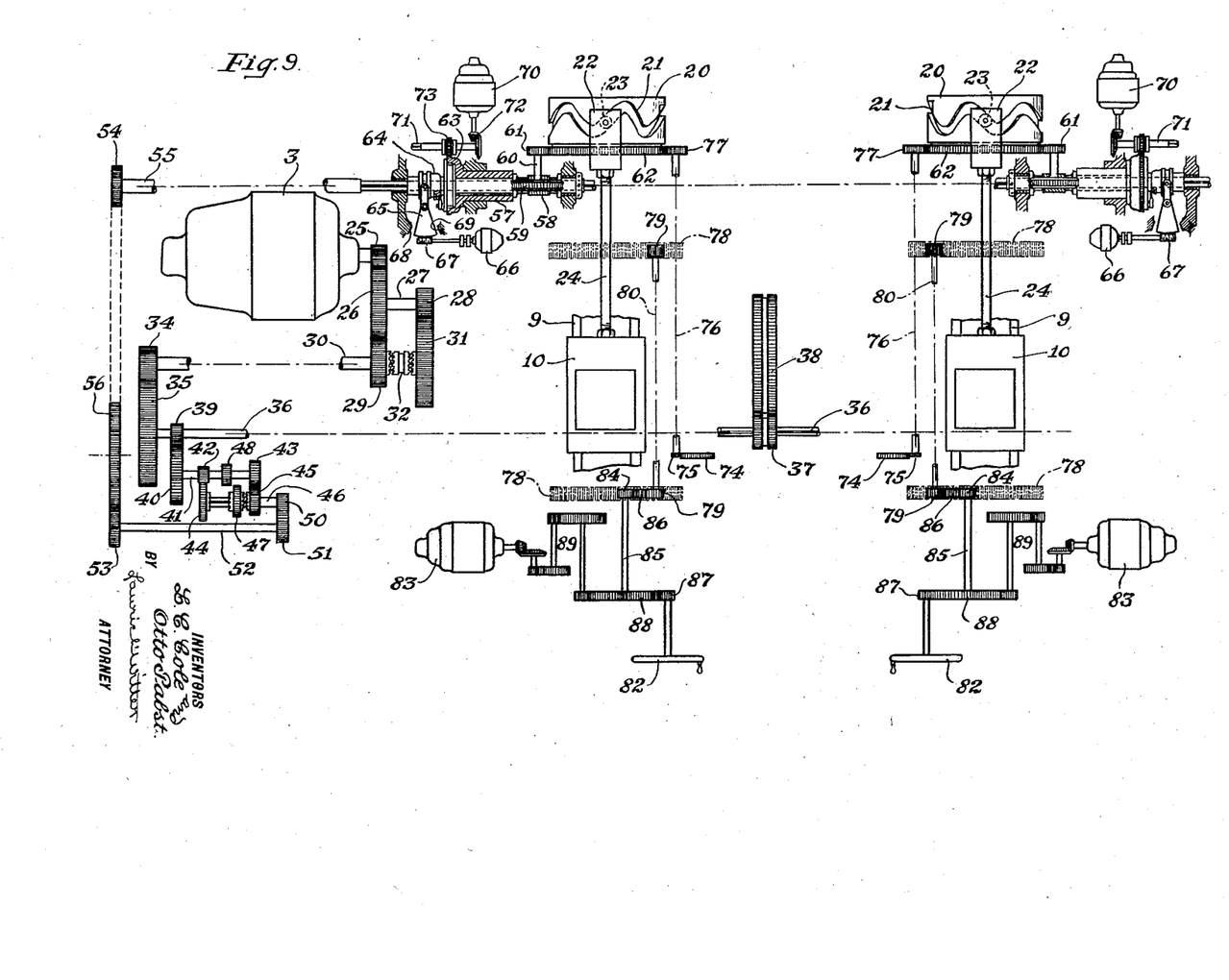
Fig. 9 is a diagrammatic view of the lathe operating mechanism.

As illustrated, a pair of racks 78 are secured to each carriage respectively adjacent the ways 7. A pair of pinions 79 on a transverse shaft 80 are respectively in mesh with these racks. An apron 81 is secured to the front of the bed beneath each carriage and gearing is housed within the apron for operating the shaft 80 either from a hand wheel 82 or from a motor 83 secured to the bed. A pinion 84 on a shaft 85 extending into the apron is operatively connected to the front pinion 79 through an idler 86. A pinion 87 on the hand wheel shaft is in mesh with a gear 88 on the shaft 85. The motor is operatively connected to the shaft 85 through the driving connections illustrated at 89 in Fig. 9. It will be understood that the carriages are ordinarily traversed only a comparatively short distance but that such traversing is necessary to completely finish each work piece. As illustrated, each carriage can be independently traversed either from the hand wheel 82 or from the motor 83.

Figure 1:
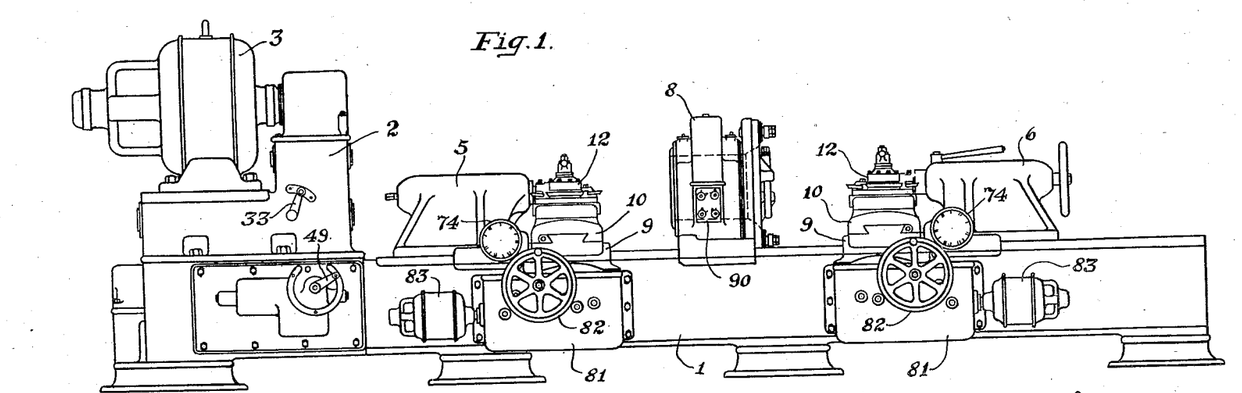
Figure 1 is a front elevation of an axle turning lathe embodying our invention.
Figure 2:
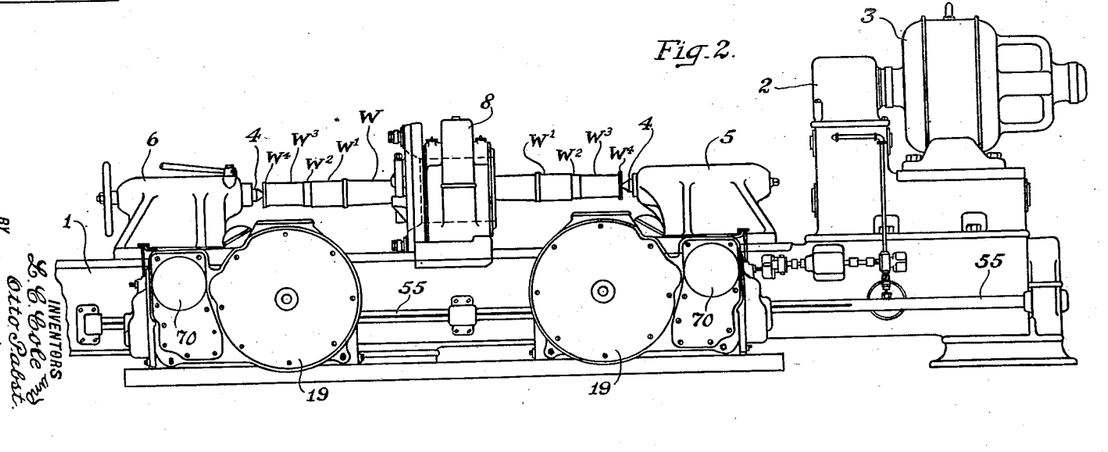
Fig. 2 is a rear elevation thereof.

The operation of the machine in turning an axle W is as follows: Initially, the cam drums 20 being adjusted to the position shown in Fig. 1, the axle is mounted on the centers 4, it being assumed that the clutch 32 and gear 47 have been shifted to their proper positions, that the clutches 63—64 are in the disengaged position, and that the turrets 12 and carriages 9 are in the starting position illustrated in Fig. 3. The motor 3 is then started and the work piece W rotated thereby.

Figure 3:
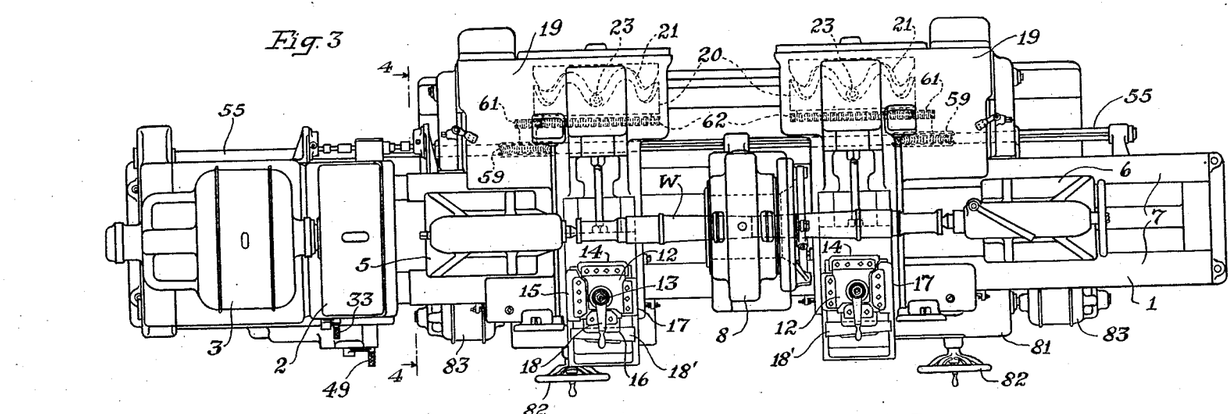
Fig. 3 is a plan view thereof.
Figure 4:
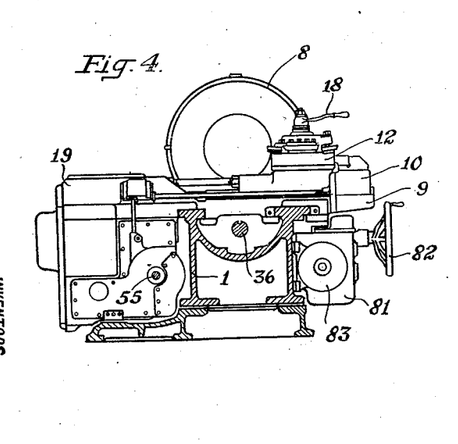
Fig. 4 is a cross section thereof on line 4—4 of Fig. 3.
Figure 5:
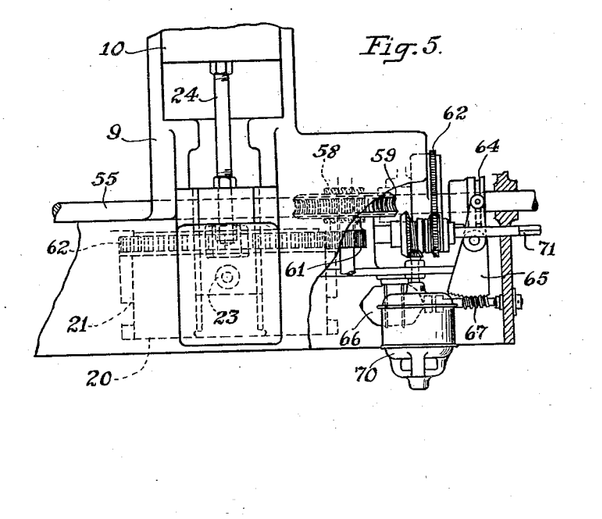
Fig. 5 is an enlarged fragmentary plan view thereof.
Figure 6:
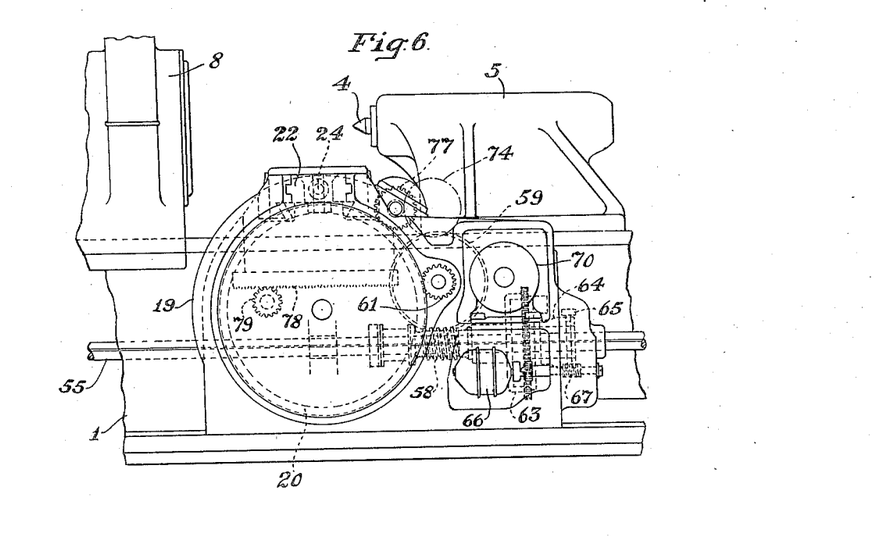
Fig. 6 is an enlarged fragmentary rear view of a portion of the machine.
Figure 7:
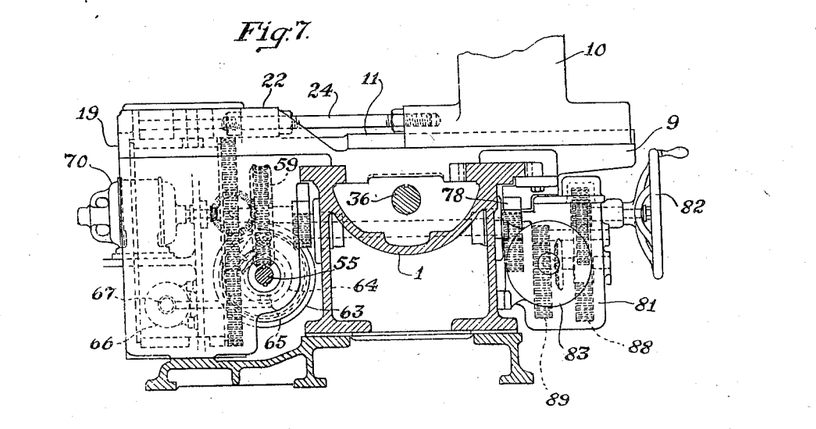
Fig. 7 is a cross sectional view similar to Fig. 4.

The first operation to be performed is the rough turning of the flange $W^4$ and the dust guard $W^2$ by the roughing tool 14. As illustrated in Fig. 3, the tool is a considerable distance away from the work piece. The operator first rotates one cam drum 20, through its motor 70, to quickly traverse the tool slide 10 inwardly to its approximate work engaging position. The corresponding clutch 63—64 is then closed by its motor 66 and rotation of the cam drum is thereupon automatically continued at feeding speed by the shaft 55. The flange $W^4$ and dust guard $W^2$ are therefore rough turned by the tool 14 as the roller 23 continues to travel along the rise $21^a$ of the cam drum, it being understood that the connection at 24 is so adjusted that the turning operation is completed when the roller reaches the top of such rise. This operation is entirely automatic and requires no further attention from the operator. While this operation is in progress, the operator starts the turning operation on the other end of the axle in the same manner. As above stated, when the roller 23 reaches the top of the cam rise $21^a$ and starts down the fall $21^b$ of the cam path, the rough turning of the surfaces $W^4$ and $W^2$ are completed. The next operation is to finish turning such surfaces with the finishing tool 15. The operator thereupon disengages the clutch 63—64 and quickly rotates the drum 20, by its motor 70, to traverse the tool slide to its outward position (Fig. 3). The turret is then indexed to bring the tool 15 into cutting position. The cam drum is then again quickly rotated from its motor 70 to bring the tool 15 up to the work piece and the clutch 63—64 is closed as before. While this finish turning operation is progressing, the operator attends to the adjusting of the mechanism at the other end of the axle in the same manner.

When the roller 23 reaches the top of the cam rise 21°, and starts down the fall 21$^d$ of the cam path, the finish turning of the surfaces W$^4$ and W$^2$ are completed. The next operation is to rough turn the journal W$^3$. The operator disengages the clutch 63—64 as before, and quickly rotates the drum 20 to bring the tool slide to its outward position (Fig. 3). The turret is then indexed to place the rough journal turning tool 16 in cutting position. The drum is then again quickly rotated to bring the tool to the work, the clutch 63—64 thereafter being closed and the turning operation progressing automatically as the roller 23 travels up the cam rise 21°. The journal is thereafter finish turned by the tool 17 in the manner above described, the roller riding up the cam rise 21$^f$ for this operation.

After the finish turning of the journal W$^3$, the next operation is the rough turning of the wheel seat W' by the roughing tool 14. The clutch 63—64 is disconnected and the cam drum is quickly rotated to bring the tool slide to its outward position (Fig. 3), the roller 23 riding down the cam fall 21$^g$ for this operation. The operator then indexes the turret to bring the tool 14 into cutting position and furthermore traverse the carriage 9 along the bed to bring the tool 14 opposite the portion W' of the work piece. This carriage traversing operation is performed by the motor 83, any fine adjustments being accomplished through the hand wheel 82, if desired. The seat W' is thereafter rough and finish turned in the same manner above described, the roller 23 riding up the cam rises 21$^h$ and 21$^i$ for these operations.

Figure 8:
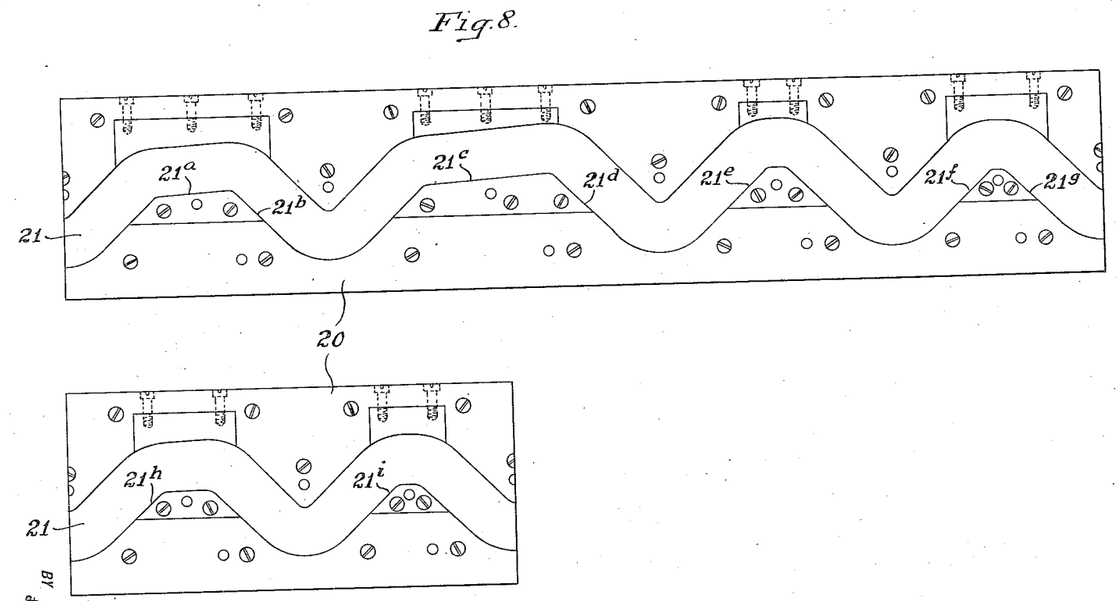
Fig. 8 is a development of one of the tool slide operating cams.

As shown in Fig. 8, the cam drum 20 has six rises and falls which correspond to the six turning operations to be performed to completely turn the work piece. It will therefore be understood that an axle is completely turned at each complete rotation of the cam drums. The independent rotation or adjustment of the cam drums from the motors 70 is each independent of the other and while a turning operation is being automatically performed on one end of the axle the operator is free to adjust the mechanism at the other end thereof. It should furthermore be noted that should the roller 23 ride past one of the cam rises and considerably into the succeeding cam fall before the operator could attend the same, no harm would result, the tool slide 10 merely being moved away from the work piece at slow speed from the shaft 55. The operator therefore has plenty of time to make the necessary adjustments above described, the machine otherwise being substantially automatic. The motors 3, 66, 70 and 83 can be controlled from switches located in a control box 90 on the head 8 between the two tool carriages.

What we claim is:

1. In a lathe, the combination of a bed having ways extending longitudinally therealong, means for rotatably supporting a work piece on the bed, a carriage slidable on the ways, a tool slide movable transversely of the ways on the carriage, a turret on the slide adapted to support a plurality of formed tools, a rotary cam having an undulatory cam path including a plurality of rises and falls, means engaging in the cam path and operatively connected to the slide, and a power element for rotating the work and cam, rotation of the cam being adapted to reciprocate the slide toward and from the work and the turret being adapted to be indexed and the carriage traversed between successive reciprocations.

2. In a lathe, the combination of means for rotatably supporting a work piece, a tool slide movable transversely of the rotary axis of the said means, a turret on the slide adapted to support a plurality of formed tools, a rotary cam having an undulatory cam path including a plurality of rises and falls, means engaging in the cam path and operatively connected to the slide, rotation of the cam being adapted to reciprocate the slide toward and from the work and the turret being adapted to be indexed between successive reciprocations, power means for rotating the work and cam for performing the cutting operations, and means including an independent motor for independently rotating the cam.

3. In a lathe, the combination of means for rotatably supporting a work piece, a tool slide movable transversely of the rotary axis of the said means, a turret on the slide adapted to support a plurality of formed tools, a rotary cam having an undulatory cam path including a plurality of rises and falls, means engaging in the cam path and operatively connected to the slide, rotation of the cam being adapted to reciprocate the slide toward and from the work and the turret being adapted to be indexed between successive reciprocations, power means for rotating the work and cam for performing the cutting operations, an independent motor operatively connected to the cam, and means adjacent the motor and cam for disconnecting the said power means from the cam and motor.

4. In a lathe, the combination of means for rotatably supporting a work piece, a tool slide movable transversely of the rotary axis of the said means, a turret on the slide adapted to support a plurality of formed tools, a rotary cam having an undulatory cam path including a plurality of rises and falls, means engaging in the cam path and operatively connected to the slide, rotation of the cam being adapted to reciprocate the slide toward and from the work and the turret being adapted to be indexed between successive reciprocations, power means for rotating the work, a shaft driven from the said power means, a sleeve on the shaft operatively connected to the cam, an independent motor operatively connected to the sleeve, and a clutch for disengageably connecting the sleeve to the said shaft.

5. In a lathe, the combination of means for rotatably supporting a work piece, a tool slide movable transversely of the rotary axis of the said means, a turret on the slide adapted to support a plurality of formed tools, a rotary cam having an undulatory cam path including a plurality of rises and falls, means engaging in the cam path and operatively connected to the slide, rotation of the cam being adapted to reciprocate the slide toward and from the work and the turret being adapted to be indexed between successive reciprocations, power means for rotating the work and cam for performing the cutting operations, means including an independent motor for independently rotating the cam, a clutch between the motor and power means, and a second motor for shifting the clutch.

6. In a lathe, the combination of work supporting and rotating means, a tool slide movable transversely of the rotary axis of the said means, a turret on the slide adapted to support a plurality of formed tools, a rotary cam having an undulatory cam path including a plurality of rises and falls, means engaging in the cam path and operatively connected to the slide, rotation of the cam being adapted to reciprocate the slide toward and from the work and the turret being adapted to be indexed between successive reciprocations, and index means operatively connected to the cam and adapted to indicate the rotary position thereof.

7. In a lathe, the combination of work supporting and rotating means, a tool slide movable transversely of the rotary axis of the said means, a turret on the slide at the front side of the said axis, the turret being adapted to carry a plurality of formed tools, a rotary cam on the rear side of the said axis, the cam having an undulatory cam path including a plurality of rises and falls, means engaging in the cam path and operatively connected to the slide, rotation of the cam being adapted to reciprocate the slide toward and from the work and the turret being adapted to be indexed between successive reciprocations, and index means at the front side of the machine, the index means being operatively connected to the cam and adapted to indicate the rotary position thereof.

8. In a lathe, the combination of a bed having ways extending longitudinally therealong, means for rotatably supporting a work piece on the bed, a carriage slidable on the ways, a tool slide movable transversely of the ways on the carriage, a turret on the slide adapted to support a plurality of formed tools, a rotary cam having an undulatory cam path including a plurality of rises and falls, means engaging in the cam path and operatively connected to the slide, a power element for rotating the work and cam, rotation of the cam being adapted to reciprocate the slide toward and from the work and the turret being adapted to be indexed and the carriage traversed between successive reciprocations, power means for traversing the carriage along the bed, and manually operated means for controlling the said power means.

9. In a lathe, the combination of a bed having ways extending longitudinally therealong, means for rotatably supporting a work piece on the bed, a carriage slidable on the ways, a tool slide movable transversely of the ways on the carriage, a turret on the slide adapted to support a plurality of formed tools, a rotary cam having an undulatory cam path including a plurality of rises and falls, means engaging the cam path and operating on the slide to intermittently engage the tools with the work as the cam rotates, and means including an electric motor for traversing the carriage along the bed.

10. In a lathe, the combination of a bed, having ways extending longitudinally therealong, means for rotatably supporting a work piece on the bed, a carriage slidable on the ways, a tool slide movable transversely of the ways on the carriage, a turret on the slide adapted to support a plurality of formed tools, a rotary cam having an undulatory cam path including a plurality of rises and falls, means engaging the cam path and operating on the slide to intermittently engage the tools with the work as the cam rotates, a rack on the carriage, a pinion on the bed in mesh with the rack, a lathe apron secured to the front of the bed, and means including gearing housed within the apron for selectively rotating the pinion by hand or power to traverse the carriage along the bed.

11. In a lathe, the combination of a bed, having ways extending longitudinally therealong, means for rotatably supporting a work piece on the bed, a carriage slidable on the ways, a tool slide movable transversely of the ways on the carriage, a turret on the slide adapted to support a plurality of formed tools, a rotary cam having an undulatory cam path including a plurality of rises and falls, means engaging the cam path and operating on the slide to intermittently engage the tools with the work as the cam rotates, a rack on the carriage, a pinion on the bed in mesh with the rack, and a motor on the bed for rotating the pinion to traverse the carriage along the bed.

12. In a lathe, the combination of a bed having ways extending longitudinally therealong, means for rotatably supporting a work piece on the bed, a carriage slidable on the ways, a tool slide movable transversely of the ways on the carriage, a turret on the slide adapted to support a plurality of formed tools, a rotary cam having an undulatory cam path including a plurality of rises and falls, means engaging the cam path and operating on the slide to intermittently engage the tools with the work as the cam rotates, two racks respectively mounted on the carriage adjacent the said ways, a pair of pinions on the bed respectively engaging the racks, and power operated means for rotating the pinions to traverse the carriage along the bed.

13. In an axle turning lathe, the combination of a bed having ways extending longitudinally therealong, a pair of work supporting members on the bed, work engaging and rotating means between the said members, a pair of carriages on the ways respectively at opposite sides of the work rotating means, a tool slide on each carriage, a tool turret on each slide, each turret being adapted to support a plurality of formed tools, a rotary cam on each carriage, each cam having an undulatory cam path including a plurality of rises and falls, and means engaging each cam path and operating on its respective slide to intermittently engage the tools thereof with the work as the cams rotate, the turrets being adapted to be indexed between the intermittent tool engagements whereby different tools thereof operate on the work.

14. In an axle turning lathe, the combination of a bed having ways extending longitudinally therealong, a pair of work supporting members on the bed, work driving means between the said members, a pair of carriages on the ways respectively at opposite sides of the work rotating means, a tool slide on each carriage, a tool turret on each slide, each turret being adapted to support a plurality of formed tools, a rotary cam on each carriage, power means for rotating the work and cams for performing the cutting operations, means for rotating the cams independently of the said power means, each cam having an undulatory cam path including a plurality of rises and falls, and means engaging each cam path and operating on its respective slide to intermittently engage the tools thereof with the work as the cams rotate, the turrets being adapted to be indexed between the intermittent tool engagements whereby different tools thereof operate on the work.

15. In an axle turning lathe, the combination of a bed having ways extending longitudinally therealong, a pair of work supporting members on the bed, work driving means between the said members, a pair of carriages on the ways respectively at opposite sides of the work rotating means, a tool slide on each carriage, a tool turret on each slide, each turret being adapted to support a plurality of formed tools, a rotary cam on each carriage, power means for rotating the work and cams for performing the cutting operations, electric motor means for rotating the cams independently of the said power means, each cam having an undulatory cam path including a plurality of rises and falls, and means engaging each cam path and operating on its respective slide to intermittently engage the tools thereof with the work as the cams rotate, the turrets being adapted to be indexed between the intermittent tool engagements whereby different tools thereof operate on the work.

16. In an axle turning lathe, the combination of a bed having ways extending longitudinally therealong, a pair of work supporting members on the bed, work driving means between the said members, a pair of carriages on the ways respectively at opposite sides of the work rotating means, a tool slide on each carriage, a tool turret on each slide, each turret being adapted to support a plurality of formed tools, a rotary cam on each carriage, power means for rotating the work and cams for performing the cutting operations, power operated means for traversing the carriages, power operated means for rotatably adjusting the cams, each cam having an undulatory cam path including a plurality of rises and falls, and means engaging each cam path and operating on its respective slide to intermittently engage the tools thereof with the work as the cams rotate, the turrets being adapted to be indexed between the intermittent tool engagements whereby different tools thereof operate on the work.

17. In an axle turning lathe, the combination of a bed having ways extending longitudinally therealong, a pair of work supporting members on the bed, work driving means between the said members, a pair of carriages on the ways respectively at opposite sides of the work rotating means, a tool slide on each carriage, a tool turret on each slide, each turret being adapted to support a plurality of formed tools, a rotary cam on each carriage, power means for rotating the work and cams for performing the cutting operations, electric motor means for traversing the carriages, electric motor means for rotatably adjusting the cams independently of the said power means, each cam having an undulatory cam path including a plurality of rises and falls, and means engaging each cam path and operating on its respective slide to intermittently engage the tools thereof with the work as the cams rotate, the turrets being adapted to be indexed between the intermittent tool engagements whereby different tools thereof operate on the work.

18. In an axle turning lathe, the combination of a bed having ways extending longitudinaly therealong, a pair of work supporting members on the bed, work driving means between the said members, a pair of carriages on the ways respectively at opposite sides of the work rotating means, a tool slide on each carriage, a tool turret on each slide, each turret being adapted to support a plurality of formed tools, a rotary cam on each carriage, power means for rotating the work and cams for performing the cutting operations, an electric motor on each carriage for independently traversing the carriages, two electric motors for respectively and independently rotating the cams, each cam having an undulatory cam path including a plurality of rises and falls, and means engaging each cam path and operating on its respective slide to intermittently engage the tools thereof with the work as the cams rotate, the turrets being adapted to be indexed between the intermittent tool engagements whereby different tools thereof operate on the work.

19. In an axle turning lathe, the combination of a bed having ways extending longitudinally therealong, a pair of work supporting members on the bed, work driving means between the said members, a pair of carriages on the ways respectively at opposite sides of the work rotating means, a tool slide on each carriage, a tool turret on each slide, each turret being adapted to support a plurality of formed tools, a rotary cam on each carriage, each cam having an undulatory cam path including a plurality of rises and falls, power means for rotating the work and cams for performing the cutting operations, means for rotating the cams independently of the said power means, a lathe apron secured to the front of the bed adjacent each carriage, means including gearing housed within each apron for traversing the carriage along the bed, and means engaging each cam path and operating on its respective slide to intermittently engage the tools thereof with the work as the cams rotate, the turret being adapted to be indexed between the intermittent tool engagements whereby different tools thereof operate on the work.

20. In a lathe, the combination of a bed having ways extending longitudinally therealong, a tool carriage slidably mounted on the ways, a lathe apron secured to the front of the bed adjacent the carriage, carriage traversing means including gearing housed within the apron, a pair of racks secured to the carriage respectively adjacent the said ways, a pair of pinions on the bed in mesh with the racks, and an operative connection from the said traversing means to the pinions.

21. In a lathe, the combination of a bed having ways extending longitudinally therealong, a tool carriage slidably mounted on the ways, a lathe apron secured to the front of the bed adjacent the carriage, carriage traversing means including gearing housed within the apron, a rack secured to the carriage, a pinion on the bed in mesh with the rack, an operative connection from the said traversing means to the pinion, a motor secured to the bed adjacent the apron, and means for selectively operating the traversing means by the motor and by hand.

In testimony whereof, we hereto affix our signatures.

LYNDON C. COLE.
OTTO PABST.